June 29, 1926.
L. G. STECKER
BATTERY GRID AND METHOD OF MAKING THE SAME
Filed Dec. 13, 1923
1,590,962
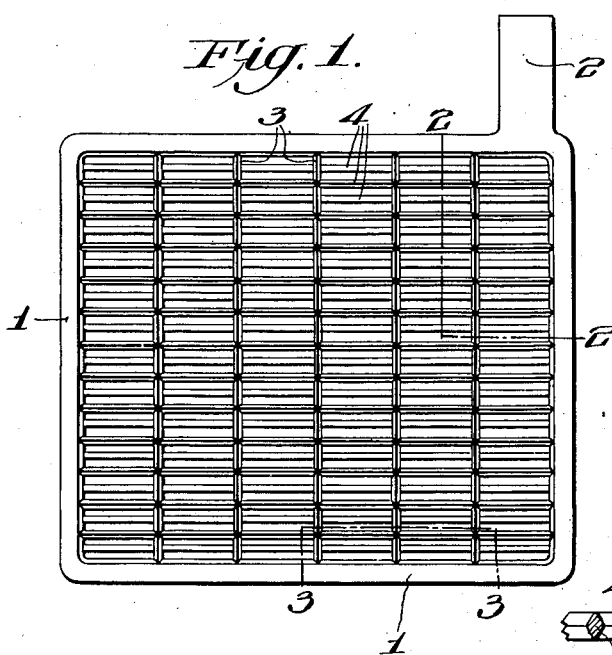
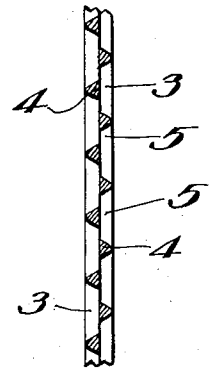
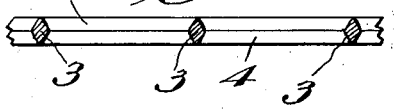
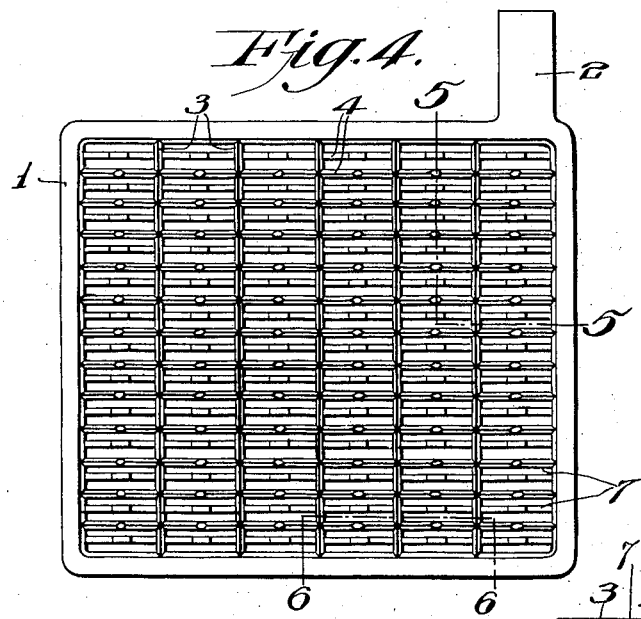
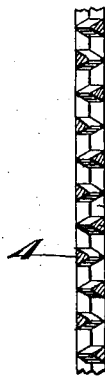
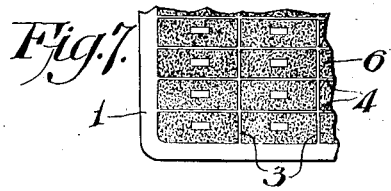
INVENTOR:
Louis G. Stecker.
BY
ATTORNEYS.

Patented June 29, 1926.

1,590,962

UNITED STATES PATENT OFFICE.

LOUIS G. STECKER, OF PHILADELPHIA, PENNSYLVANIA.

BATTERY GRID AND METHOD OF MAKING THE SAME.

Application filed December 13, 1923. Serial No. 680,296.

My invention relates to a novel construction of a battery grid for secondary or storage batteries and more particularly for the type of storage batteries which are employed on motor vehicles and apt to be subjected to excessive vibrations.

My invention comprehends a novel construction of a battery grid in which provision is made for most effectively retaining the active material in place, and also comprehends a method for making the grid.

Other features of construction of the grid are hereinafter described in the specification and particularly set forth in the claims.

For the purpose of illustrating my invention, I have shown in the accompanying drawings a certain type and embodiment of it which is at present preferred by me, because in practice it will give satisfactory and reliable results. It is to be understood, however, that the various instrumentalities in which my invention is shown as embodied can be variously arranged and organized and that my invention is not, therefore, limited to the precise arrangement and organization of these instrumentalities as herein shown and described.

Figure 1 represents a side view of a grid embodying a good form of my invention in the first stage of its manufacture.

Figure 2 represents a vertical section on the line 2—2 of the grid of Figure 1.

Figure 3 represents a horizontal section on the line 3—3 of the grid of Figure 1.

Figure 4 represents a side view of the grid illustrated in Figures 1, 2, and 3 in the second stage of its manufacture.

Figure 5 represents a vertical section on the line 5—5 of the grid of Figure 4.

Figure 6 represents a horizontal section on the line 6—6 of the grid of Figure 4.

Figure 7 represents an elevation of a fragmentary portion of the grid illustrated in Figure 4 after the active material has been introduced in the last stage of its manufacture.

Similar numerals of reference indicate corresponding parts.

Referring to the drawings, 1 designates the metal plate or frame of the usual form and from which extends the usual binding post 2.

In the grid of the first three figures there are enclosed and formed within the frame and preferably paralleling each other and the ends of the frame, a group or series of primary ribs 3, spaced apart at preferred distances from each other, and serving to retain between them in their cast relationship other groups of secondary ribs 4 which likewise preferably parallel each other and the upper and lower members of the frame and are preferably but not necessarily rightangular to said primary ribs.

All of the primary ribs 3 and all of the secondary ribs 4 are cast or die-stamped as a grid-entirety, first in the general formation of Figure 1, and the primary ribs are preferably but not necessarily diamond-shaped in cross-section, as best shown in Figure 2, while the secondary ribs, preferably in close but alternate or staggered relationship and disposition, are preferably but not necessarily triangular in cross-section, with the bases of the triangles all, alternately, facing inward to the central plane of the frame, and the apices of the triangles alternately facing outward to the level of the imaginary outside plane of each face of the frame,—with the result that flat open or sunken spaces 5, which are adapted to be filled with active material 6 to the levels of both of the outside planes of the frame, exist between the secondary ribs and the primary ribs.

Obviously, in the foregoing construction were the active material to be filled into the open spaces among the ribs, it would have a tendency, should the grid as a whole warp, to fall out.

To prevent this happening and securely to retain the active material in the open spaces, I preferably bend each row of all of the groups of the secondary ribs, oppositely and row by row, so that the formation imparted to said secondary ribs is the formation best illustrated in Figure 6, and, as will be obvious, in so doing I form instead of flat open spaces as in Figures 1, 2, and 3, oppositely bent open spaces which form curved chambers 7, so to speak, see Figures 4, 5, and 6.

When the active material has been introduced, it will fill the curved chambers and become locked within and among all of the ribs both primary and secondary.

Before describing the method of making my grid as a whole, I should say that in effecting the bending of the triangular secondary ribs I exert the pressure of the dies or punching devices against the apex sides of said secondary ribs, so that the basal sides, which are the insides of each bent, curved or looped secondary rib, is forced outward into the outside plane of the frame while the apex side is forced inward into the area of the central plane of the frame.

The method of making my battery grid to which I prefer to resort, is to make an original casting of the character, for instance, of the grid of the first three figures, which I do either by molding or die-casting, preferably casting the grids in pairs, the binding posts of the two grids being in alignment.

I then, by stamping or punching devices operating simultaneously upon both sides of the grid formed as in Figure 1, strike the secondary ribs into alternate and opposite curves so that the grid assumes the final form represented in Figures 4, 5, and 6.

The grids are cast in pairs, after they have been cast it is necessary to cut off the gate, and as the grids are soft when taken from the mold it is necessary to straighten them, which is best done by the use of a punch-press having a double acting die, and a shearing knife, the die flattening the grid and holding it fast while the knife shears off the gate and vents.

Otherwise to express it, I turn the bars inside out, flatten the grid frame, and cut off the gate and vents in one operation, which, without adding to the expense, results in the making of a better grid.

The bending of the secondary ribs into the curved formation described, results in the formation of what I have called the curved chambers 7 which prevent the active material when once introduced or wedged in, from falling out.

The foregoing advantage is also resultant of the fact that the secondary ribs are in practice preferably not of the full depth of the frame, but only about half as deep.

I am aware that it has heretofore been proposed to construct alternate grids of ribs deflected in opposite directions away from the frame, but in such construction the ribs do not lie within the outside planes of the frame and the construction as an entirety is weakened rather than strengthened as in my present invention.

Having thus described my invention, what I claim as new and desire to secure by Letters Patent, is:—

1. A grid comprising spaced primary ribs and spaced secondary ribs angularly disposed in respect to said primary ribs, successive adjacent secondary ribs being bent in opposite directions transversely of the grid; each bend extending between adjacent primary ribs.

2. A grid comprising spaced primary and spaced secondary ribs angularly disposed with respect to said primary ribs, successive adjacent secondary ribs being on alternate sides of the median plane of the grid, and being bent in opposite directions transversely of the grid; each bend extending between adjacent primary ribs.

3. A grid comprising spaced diamond-shaped primary ribs and spaced triangular-shaped secondary ribs angularly disposed with respect to said primary ribs, successive adjacent secondary ribs being bent in opposite directions transversely of the grid; each bend extending between adjacent primary ribs.

4. A grid comprising spaced diamond-shaped primary ribs and spaced triangular-shaped secondary ribs angularly disposed with respect to said primary ribs, successive adjacent secondary ribs being on alternate sides of the median plane of the grid, and being bent in opposite directions transversely of the grid; each bend extending between adjacent primary ribs.

LOUIS G. STECKER.